G. W. NOBLE.
FIRE HOSE CABINET.
APPLICATION FILED JUNE 17, 1911.
1,049,136.
Patented Dec. 31, 1912.
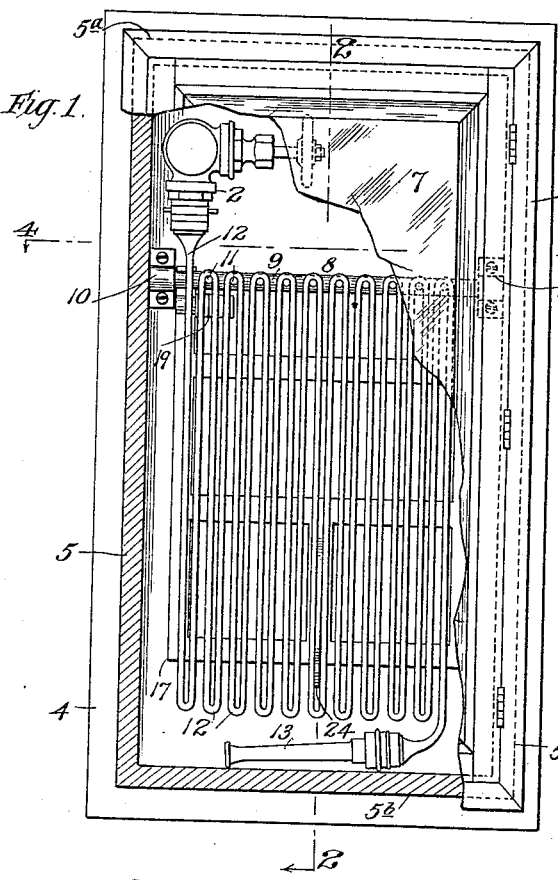
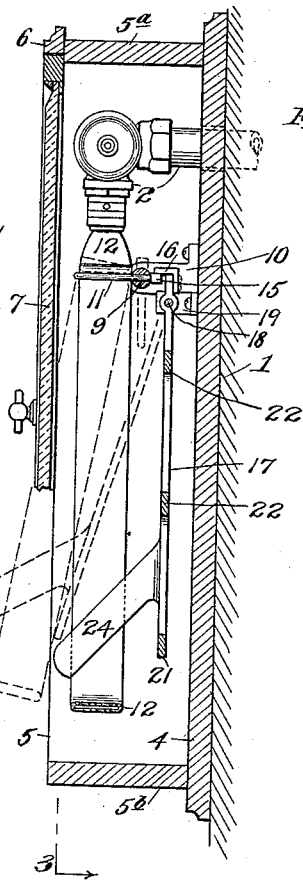
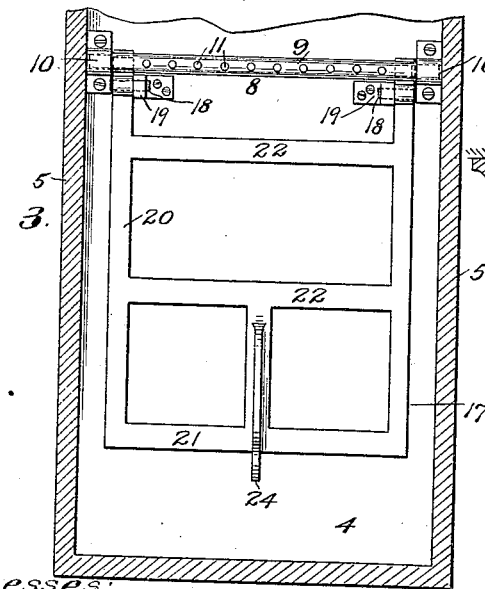
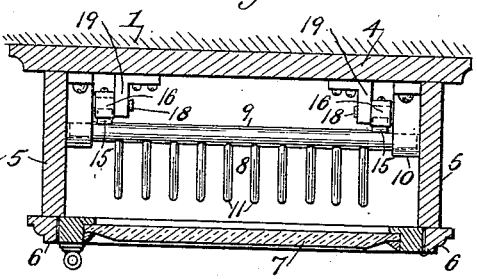
Inventor:
George W. Noble
by his Attys

UNITED STATES PATENT OFFICE.

GEORGE W. NOBLE, OF BROOKLYN, NEW YORK, ASSIGNOR TO JOHN SIMMONS COMPANY, OF NEW YORK, N. Y., A CORPORATION OF NEW YORK.

FIRE-HOSE CABINET.

1,049,136.  Specification of Letters Patent.  Patented Dec. 31, 1912.

Application filed June 17, 1911. Serial No. 633,724.

*To all whom it may concern:*

Be it known that I, GEORGE W. NOBLE, a citizen of the United States, residing at Brooklyn, county of Kings, and State of New York, have invented certain new and useful Improvements in Fire-Hose Cabinets, fully described and represented in the following specification and the accompanying drawings, forming a part of the same.

This invention relates to certain improvements in fire hose supporting devices.

The especial object of the invention is to produce a fire hose supporting device suitable for use in office and other buildings of such character and arrangement that the parts may be suitably incased whereby they are less liable to become injured by dirt or rust than if exposed to the air, and less likely to be tampered with, but at the same time may be very quickly and expeditiously brought into use. Generally this object is carried out by incasing the device in a casing or cabinet secured to the wall or sunk in a recess formed in the wall of the building with which it is used, though if desired in some circumstances the sides of a recess sunk in the wall may be used for incasing the device. The device includes a member which is provided with hose loop holding means on which the hose may be hung in loops. This loop holding member is preferably pivoted and on being rocked on its pivot acts to drop the hose and free it very quickly. To insure the hose being freed from the casing, there is provided an ejecting device adapted to contact with the loops of the hose and acting to eject them from the casing. This ejecting device also preferably coöperates with the pivoted member to cause it to drop the hose and acting in conjunction with it provides a very speedy means for freeing the hose from the casing in condition for immediate use.

For a more complete understanding of the invention, a detailed description of the same will now be given in connection with the accompanying drawings, in which—

Figure 1 is a face view partly in section and partly broken away, showing the improved fire hose supporting device with the hose in position of non-use; Fig. 2 is a vertical section on line 2—2 of Fig. 1; Fig. 3 is a view similar to Fig. 1, partly broken away, the hose being removed to show the ejector device; Fig. 4 is a cross section on line 4—4 of Fig. 1.

Referring now to the drawings, an improved fire hose supporting device is shown as secured to a wall of the building which is indicated by the numeral 1. It will, of course, be understood, however, that the device may be used in other relations, if desired, as being positioned in a recess in the wall. As illustrated in the drawings, the improved device includes a casing or cabinet which when used has a back 4, by which it is secured to the wall of the building, side walls 5, and top and bottom 5$^a$ and 5$^b$. Secured to the side walls in any suitable manner may be provided a molding 6 to which is hinged a door 7.

Located in the casing is a hose loop holding member 8, the construction of which may be somewhat varied. In the particular construction illustrated, this member comprises a bar or rod 9 (see Fig. 4) which is pivotally mounted so as to swing freely in ears 10 suitably secured in the casing to the back wall 4 thereof. The bar 9 is provided with a plurality of hose loop holding projections which, in the particular construction illustrated, are short rods 11, rigidly fixed to the bar. The hose 12 is connected at one end to the stand-pipe 2, which is shown preferably inclosed by the casing, and is looped over these loop holding rods 11 in individual loops, the other end of the hose being attached to a nozzle 13, which may lie on the bottom wall 5$^b$ of the casing, or be otherwise disposed so as to be readily accessible.

When a pivoted hose loop holding bar is employed means are provided for holding it and the hose looped thereto in hose holding position, as shown in full lines in Figs. 1 and 2, and these means are of such a character as to lock the bar in position by engagement therewith so that when the holding means are released from engagement the weight of the hose rocks the bar on its pivots and the hose is freed therefrom. To facilitate the removal of the hose from the casing and to insure its dropping free from the casing when it is released from the bar and so preventing it from catching on the bottom of the casing and becoming tangled, an ejector device is provided which acts to eject or throw the hose from the casing. Preferably also, and as illustrated, this ejector device acts to hold the bar in hose holding position, being provided with means engaging with the bar for accomplishing this purpose.

The construction of the ejector device and the means controlled by it for holding the bar in position may be very widely varied. In the particular construction illustrated, the holding bar is provided near each of its ends with lugs 15 with which lugs are arranged to engage holding members 16 suitably secured on the ejector device, and which will be hereinafter referred to. This ejecting device acts to eject or throw the hose outwardly from the casing so that it will fall free, and preferably the ejector device acts to so throw the lower portion of the hose free of the casing just before the holding means are released and the bar permitted to drop to free the hose from the hose holding projections on the bar.

In the construction illustrated, which shows a convenient form of ejector, the ejector device includes a frame 17 which is pivoted on studs 18 mounted in ears 19 suitably secured on the back wall 4 of the casing. The frame 17 comprises side strips 20 and a cross strip 21 connecting the side strips 20 at or near their lower ends. This cross strip 21 is in the particular construction illustrated the part of the ejector which contacts with the hose and ejects it from the casing. The strip 21 will, therefore, be of suitable width to contact with all the hose loops so as to throw them all from the casing. Other cross strips 22 may be provided, but these may be omitted if their employment is not desired. The ejector frame 17, as before stated, is provided at its upper part with the holding members 16, one of these holding members being provided on the end of each of the side frames 20. These holding members are so shaped as to permit the frame to be swung outwardly sufficiently to eject the bottom part of the hose from the casing before they release the bar 9, which holds the hose loops. When the hose is in position the weight of the hose causes the ejector frame to lie back close to the back wall of the casing. To operate the ejector frame suitable means are provided such as a handle 24 suitably secured to the frame and projecting beyond the loops of the hose, as indicated in Fig. 2, by which the ejector may be rocked on its pivot to eject and release the hose so that it will fall clear of the casing.

With the construction above described, a very efficient hose apparatus is provided and one which may be very quickly put into operation, the ejector device acting in conjunction with the pivoted hose holding bar to throw the hose clear of the casing without danger of the hose becoming tangled or otherwise unfit for immediate use.

It will be understood that the invention is not limited to the precise construction illustrated and described, but that changes and variations may be made in the structure which will embody the invention and will not be a departure therefrom.

What is claimed is:—

1. In a device of the character described, the combination with an incasing means, of a member located therein and provided with hose loop-holding means, and an ejecting device operatively connected with the hose loop holding means for releasing the same and for ejecting the hose from the incasing means.

2. In a device of the character described, the combination with a casing, of a member located therein and provided with hose loop-holding means, and an ejecting device operatively connected with the hose loop holding means for releasing the same and for ejecting the hose from the casing.

3. In a device of the character described, the combination with a casing, of a pivoted member provided with hose loop-holding means located therein and arranged to rock on its pivot to release the hose, and an ejecting device operatively connected with the pivoted member for releasing the member and ejecting the hose from the casing.

4. In a device of the character described, the combination with a casing, of a pivoted member located therein provided with hose loop-holding means, means engaging therewith for retaining the member in hose-holding position, and an ejector device acting to release the engaging means and to eject the hose from the casing.

5. In a device of the character described, the combination with a casing, of a pivoted member located therein provided with loop-holding means, a pivoted ejector device, means on the ejector for engaging with the pivoted member to retain it in hose-holding position, and means for operating the ejector to cause it to release the pivoted member and to eject the hose from the casing.

6. In a device of the character described, the combination with a casing, of a pivoted member located therein provided with hose loop-holding means, means engaging therewith for holding the member in hose-holding position, and an ejector device having a part adapted to be brought into contact with the hose, said ejector device acting to release the engaging means and to eject the hose from the casing.

7. In a device of the character described, the combination with a casing, of a pivoted member located therein provided with hose loop-holding means, and an ejector device having a part adapted to be brought into contact with the hose, and means for operating the ejector to eject the hose from the casing.

8. In a device of the character described, the combination with a casing, of a pivoted member located therein provided with hose loop-holding means, a pivoted ejector provided with means engaging with the pivoted member for holding it in hose holding position, said ejector having a part adapted to be brought into contact with the hose, and acting to eject the hose from the casing and to release the engaging means whereby when the hose is released from the holding means it will fall free of the casing.

In testimony whereof, I have hereunto set my hand, in the presence of two subscribing witnesses.

GEORGE W. NOBLE.

Witnesses:
A. WHITE,
P. B. PHILIPP.

Copies of this patent may be obtained for five cents each, by addressing the "Commissioner of Patents, Washington, D. C."